(12) United States Patent
Kim

(10) Patent No.: US 12,370,754 B2
(45) Date of Patent: Jul. 29, 2025

(54) GRP DOOR MANUFACTURING SYSTEM

(71) Applicant: SUNGIL CO., LTD., Gyeongsangnam-do (KR)

(72) Inventor: Sung Jin Kim, Busan (KR)

(73) Assignee: SUNGIL CO., LTD., Gyeongsangnam-do (KR)

( * ) Notice: Subject to any disclaimer, the term of this patent is extended or adjusted under 35 U.S.C. 154(b) by 0 days.

(21) Appl. No.: 18/259,788

(22) PCT Filed: May 24, 2023

(86) PCT No.: PCT/KR2023/007106
§ 371 (c)(1),
(2) Date: Jun. 29, 2023

(87) PCT Pub. No.: WO2023/229383
PCT Pub. Date: Nov. 30, 2023

(65) Prior Publication Data
US 2024/0198606 A1    Jun. 20, 2024

(30) Foreign Application Priority Data
May 25, 2022  (KR) .......................... 10-2022-0064257

(51) Int. Cl.
| | |
|---|---|
| *E06B 3/72* | (2006.01) |
| *B29C 65/54* | (2006.01) |
| *B29C 65/78* | (2006.01) |
| *B29C 70/32* | (2006.01) |
| *B32B 38/18* | (2006.01) |
| *E06B 3/70* | (2006.01) |
| *B25J 18/00* | (2006.01) |

(Continued)

(52) U.S. Cl.
CPC ............ *B29C 70/32* (2013.01); *B29C 65/542* (2013.01); *B29C 65/7861* (2013.01); *E06B 3/7001* (2013.01); *B25J 18/00* (2013.01); *B29L 2031/724* (2013.01); *B32B 38/0008* (2013.01); *B32B 38/0036* (2013.01); *B32B 38/18* (2013.01); *B32B 38/1858* (2013.01)

(58) Field of Classification Search
CPC .......... B29L 2031/724; B32B 38/0008; B32B 38/0036; B32B 38/1858; B32B 38/18; B29C 65/7861

See application file for complete search history.

(56) References Cited

U.S. PATENT DOCUMENTS

| | | | | | |
|---|---|---|---|---|---|
| 6,068,802 | A | * | 5/2000 | Berghorn | ............ B29C 44/1233 156/78 |
| 2007/0082997 | A1 | * | 4/2007 | Pfau | ...................... E06B 3/7001 524/449 |
| 2009/0071609 | A1 | * | 3/2009 | Stroup | .................... E06B 3/822 156/559 |

FOREIGN PATENT DOCUMENTS

| | | |
|---|---|---|
| JP | 2016155356 A | 9/2016 |
| KR | 200299852 Y1 | 1/2003 |
| KR | 101497056 B1 | 3/2015 |

(Continued)

*Primary Examiner* — Scott W Dodds
(74) *Attorney, Agent, or Firm* — Bayramoglu Law Offices LLC

(57) ABSTRACT

A GRP door manufacturing system is provided and configured to manufacture a GRP door by attaching a lower GRP door skin to a lower surface of a wood frame, filling urethane into a space within the wood frame, attaching an upper GRP door skin to an upper surface of the wood frame, and then performing thermo-compression for a predetermined time.

2 Claims, 17 Drawing Sheets

(51) Int. Cl.
*B29L 31/00* (2006.01)
*B32B 38/00* (2006.01)

(56) References Cited

FOREIGN PATENT DOCUMENTS

| KR | 101611201 B1 | 4/2016 |
| KR | 101685883 B1 | 12/2016 |
| KR | 20180046948 A | 5/2018 |
| KR | 102433247 B1 | 8/2022 |

\* cited by examiner

GRP DOOR MANUFACTURING SYSTEM

CROSS REFERENCE TO THE RELATED APPLICATIONS

This application is the national phase entry of International Application No. PCT/KR2023/007106, filed on May 24, 2023, which is based upon and claims priority to Korean Patent Application No. 10-2022-0064257, filed on May 25, 2022, the entire contents of which are incorporated herein by reference.

TECHNICAL FIELD

The present disclosure relates to a GRP door manufacturing system. More particularly, the present disclosure relates to a GRP door manufacturing system configured to manufacture a GRP door by attaching a lower GRP door skin to a lower surface of a wood frame, filling urethane into a space within the wood frame, attaching an upper GRP door skin to an upper surface of the wood frame, and then performing thermo-compression for a predetermined time.

BACKGROUND

In general, a synthetic resin door installed at an entrance of a general house or an office is completed by molding a frame suitable for a shape of the entrance and attaching a synthetic resin decorative panel with a pattern of a certain shape suitable for a user's taste to an outer surface of the frame with an adhesive.

Furthermore, the synthetic resin decorative panel is formed of materials that are light but durable, such as GRP (Glass-Fiber Reinforced Plastics, Glass-Fiber Reinforced Polyester Resin) and ENM (Elvan Nephrite Marlle), which are lightweight and durable materials. The GRP and ENM are made into panels (plates) of a certain shape by SMC (GRP Sheet Molding Compound) compression molding, one of the molding techniques for shaping products.

As the representative related art about a door using a GRP panel, Korean Intellectual Property Office Korean Patent No. 10-1497056 (Title: A door for crime prevention) can serve as an example.

The door of the related art includes: a pair of front and rear GRP panels that have fire resistance and constitute front and rear surfaces of the door in a plate shape; protruding frames protruding from opposite side portions of inner surfaces of the front and rear GRP panels; a metal plate fitted between the front and rear GRP panels and tightly fixed to inner surfaces of the protruding frames of the front and rear GRP panels and reinforcing bending of the front and rear GRP panels; a fire-resistant wood having a protruding step fitted into an insertion space between the protruding frames of the front and rear GRP panels and fixed with a fastening pin while being in close contact with outer surfaces of the protruding frames of the front and rear GRP panels; an adhesive applied to contact surfaces between the front and rear GRP panels and the fire-resistant wood; and flame retardant urethane foam filled into a space between the front and rear GRP panels and providing sound insulation.

Meanwhile, when the GRP panel (GRP skin) constituting the surfaces of the GRP panel door is formed in the forming mold, burrs are inevitably generated along a circumferential surface of the GRP panel. Therefore, a burr removing process proceeds on the formed GRP panel.

However, conventionally, the GRP panel molding process and the burr removing process for the formed GRP panel could not be continuously performed through automation. Specifically, the burr removing process is often performed manually by a worker using a tool such as a grinder, etc., so that poor workability and productivity may occur.

Document of Related Art (Patent Document 1): Korean Intellectual Property Office Korean Patent No. 10-1497056

SUMMARY

Technical Problem

Accordingly, an objective of the present disclosure in order to solve the above problem is to provide a GRP door manufacturing system configured to manufacture a GRP door by attaching a lower GRP door skin to a lower surface of a wood frame, filling urethane into a space within the wood frame, attaching an upper GRP door skin to an upper surface of the wood frame, and then performing thermo-compression for a predetermined time.

Technical Solution

In order to achieve the above-described objective, according to an aspect of the present disclosure, there is provided a GRP door manufacturing system configured to manufacture a glass fiber reinforced plastic (GRP) door composed of a wood frame, a GRP door skin covered on each of an upper surface and a lower surface of the wood frame, and a flame retardant urethane foam filled in a space within the wood frame, the GRP door manufacturing system including: a GRP door skin stacking stand on which the GRP door skin may be stacked in multiple layers; a wood frame stacking stand on which the wood frame may be stacked in multiple layers; a conveyor configured to transfer the GRP door skin supplied from the GRP door skin stacking stand, forwards; a plasma processing unit including plasma processors, the plasma processors being respectively located at an upper surface and a lower surface of the conveyor, being configured to be moved leftwards and rightwards by power of a driving source, and configured to respectively plasma-process an inner surface and an outer surface of the GRP door skin moved while riding on the conveyor; a conveyor located in front of the plasma processing unit and configured to transfer the GRP door skin supplied in a plasma-processed state, forwards; a bonding unit located above the conveyor and including an application roller configured to apply an adhesive on the inner surface of the GRP door skin; a conveyor configured to transfer the GRP door skin on which the adhesive may be applied; a preheating unit surrounding the conveyor and configured to preheat the GRP door skin moved while riding on the conveyor; a robot arm located in front of the preheating unit and configured to be operated according to a control signal preset in a control unit; a plate provided at the robot arm; a wood frame clamping part provided at an outer portion of the plate and configured to clamp and take out the wood frame stacked on the wood frame stacking stand; a GRP door skin and wood frame inserting unit including a GRP door skin absorber provided at an outer surface of the plate, where after the wood frame clamping part clamps the wood frame, the GRP door skin absorber may absorb and take out the GRP door skin that has passed through the preheating unit; a GRP door skin reverse unit located at an upper-front portion of the preheating unit, where while another GRP door skin that has passed through the preheating unit is absorbed, the GRP door skin reverse unit may be configured to reverse and support the another GRP door skin such that the inner surface thereof may be directed downwards; a lower mold including a core in which the wood frame and the GRP door skin ejected from the GRP door skin and wood frame inserting unit may be supplied and received; a flame retardant urethane foam inlet configured to fill the flame retardant urethane foam into the space within the wood frame received in the core of the lower mold; and a forming unit including a forming mold configured to form the GRP door, where while the another GRP door skin reversely supported at the GRP door skin reverse unit is supplied at the upper surface of the wood frame filled with the flame retardant urethane foam by driving the GRP door skin and wood frame inserting unit, the wood frame and the GRP door skins covering the upper surface and the lower surface of the wood frame are thermo-compressed together by combining an upper mold.

The GRP door skin reverse unit may include: a shaft rotated by power of a motor; a tilting frame shaft-coupled to the tilting frame and rotated on the shaft; a cylinder supported by the tilting frame; a plate to which a rod of the cylinder may be coupled and moved forwards and rearwards by power of the cylinder; and an absorber provided at a corner of one surface of the plate and configured to absorb the another GRP door skin.

Advantageous Effects

The present disclosure is configured to manufacture the GRP door by attaching the lower GRP door skin to the lower surface of the wood frame, filling urethane into the space within the wood frame, attaching the upper GRP door skin to the upper surface of the wood frame, and then performing thermo-compression for the predetermined time. Accordingly, it is possible to increase productivity and workability through automation of the GRP door and to minimize a defect rate, so that the present disclosure has an operational effect of increase marketability.

DESCRIPTION OF REFERENCE NUMERALS

Figure 1:
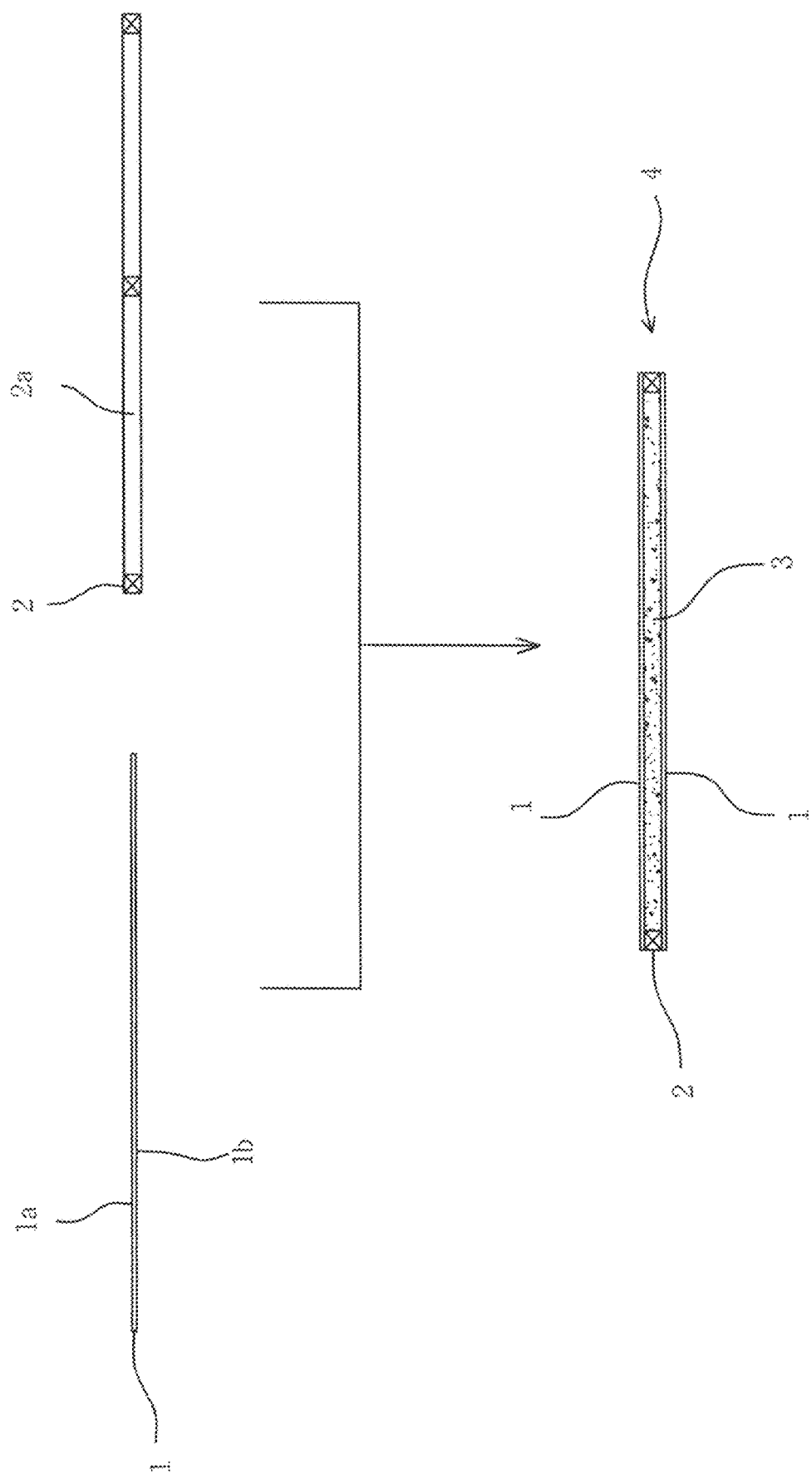
FIG. 1 is a view showing a process of molding a GRP door by using a GRP door skin and a wood frame of the present disclosure.

1: GRP door skin 2: wood frame
3: flame retardant urethane foam 4: GRP door
10: GRP door skin stacking stand 20: wood frame stacking stand
30: plasma processing unit 32: conveyor
40: the bonding unit 42: conveyor
44: application roller 50: preheating unit
52: conveyor 60: GRP door skin and wood frame inserting unit
62: robot arm 66: wood frame clamping part
74: GRP door skin absorber 80: forming unit
82: turntable 84: forming mold
86: lower mold 88: upper mold
100: GRP door skin reverse unit 106: tilting frame
108: cylinder 110: plate
112: GRP door skin absorber Detailed Description of the Embodiments Hereinbelow, an exemplary embodiment of the present disclosure will be described with reference to accompanying drawings. In the detailed description described below, a representative embodiment of the present disclosure for achieving the above described technical problem will be proposed. Furthermore, other embodiments that may be proposed as the present disclosure will be replaced with descriptions in configuration of the present disclosure.

As shown in FIG. 1, a GRP door manufacturing system of the present disclosure is configured to attach a sheet type GRP door skin 1 formed through a GRP door skin molding apparatus that is a previous process, on a lower surface of a wood frame 2 manufactured in a rectangular frame shape, and then fill an urethane foam 3 into a space within the wood frame 2, and then cover a separate GRP door skin 1 on an upper surface of the wood frame 2, and then manufacture a GRP door 4 through a thermo-compression process for a predetermined time. Specifically, the GRP door manufacturing system is configured to automatically perform the above-mentioned process to enable mass production through automation.

The GRP door 4 manufactured using the GRP door skins 1 is composed of a pair of GRP door skins 1 providing a front surface and a rear surface of the GRP door 4, the wood frame 2 provided between the pair of GRP door skins 1 and generating a space between the GRP door skins 1, and the flame retardant urethane foam 3 filled in the space generated between the GRP door skins 1.

Hereinbelow, the entire system for manufacturing the GRP door will be described.

Figure 2:
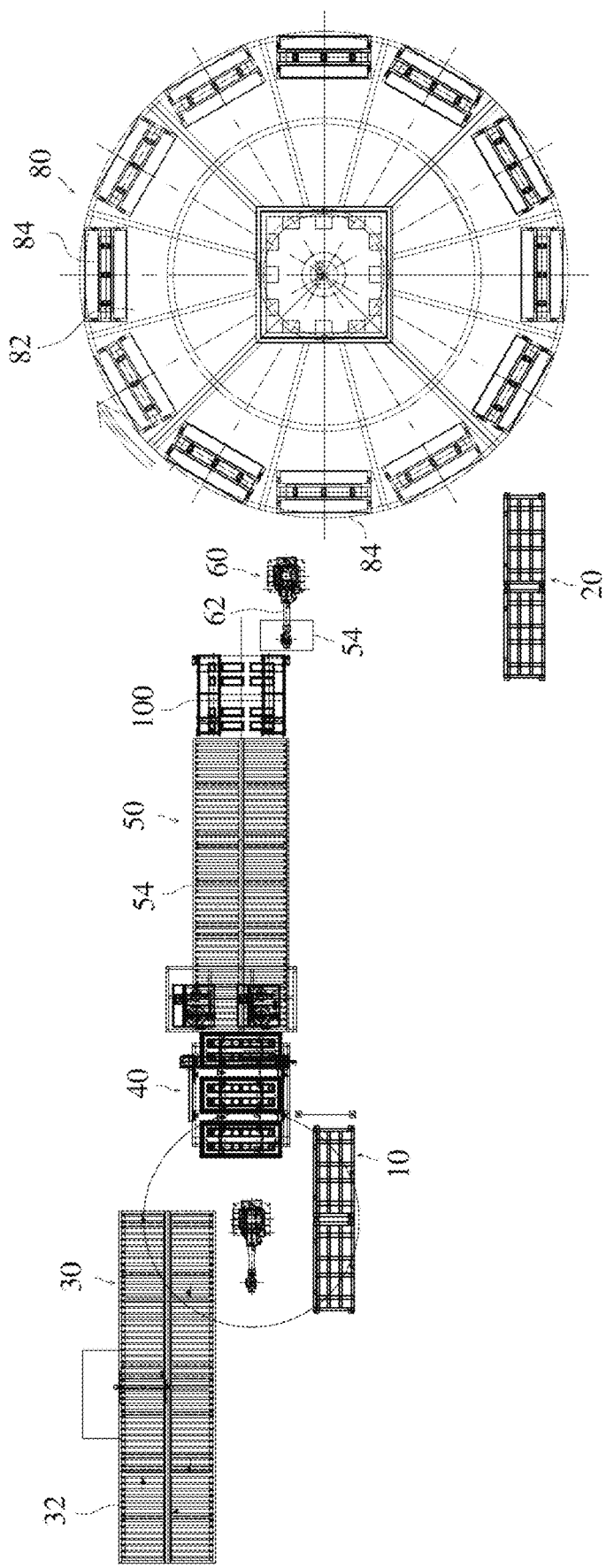
FIG. 2 is a plan view showing entire configuration of a GRP door manufacturing system according to the present disclosure.

Accompanying FIG. 2 is a view showing the entire configuration of the GRP door manufacturing system according to an exemplary embodiment of the present disclosure.

As shown in FIG. 2, the GRP door manufacturing system includes a GRP door skin stacking stand, a wood frame stacking stand, a plasma processing unit, a bonding unit, a preheating unit, a GRP door skin reverse unit, a GRP door skin and wood frame inserting unit, and a compression forming unit.

On the GRP door skin stacking stand 10, the GRP door skin 1 formed in a sheet type through the previous process is stacked in multiple layers, and on the wood frame stacking stand 20, the wood frame 2 constituting a frame of the GRP door 4 is stacked in in multiple layers. The wood frame 2 is formed in a rectangular frame shape to match with the exterior shape of the GRP door 4, and is stacked in multiple layers on the wood frame stacking stand 20.

A plasma processing unit 30 is a preprocessing unit serving to plasma-process a surface (inner surface and outer surface) of the GRP door skin 1 stacked on the GRP door skin stacking stand 10 so that a paint can be well applied to a surface of the GRP door skin.

Figure 3:
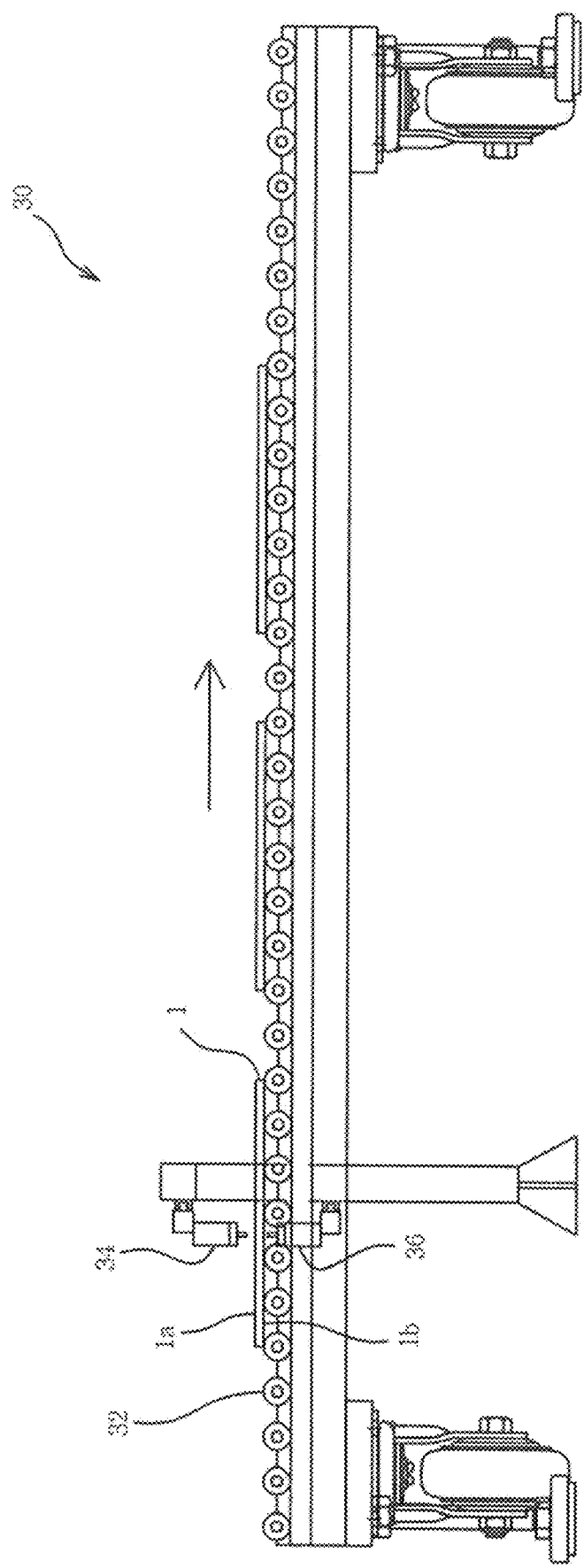
FIG. 3 is a view showing a side surface of a plasma processing unit of FIG. 2.

Accompanying FIG. 3 is a view showing the plasma processing unit. As shown in FIG. 3, while the GRP door skin 1 is moved on a conveyor 32, the plasma processing unit 30 proceeds. a plurality of plasma processors 34 and 36 is located on an upper surface and a lower surface of the conveyor 32, and the plasma processors 34 and 36 are installed at a reciprocating motion stand, which reciprocates leftwards and rightwards with power of a drive source, and reciprocate leftwards and rightwards along an inner surface 1*a* and an outer surface 1*b* of the GRP door skin 1 moving forwards on the conveyor 32, and plasma-process the inner surface 1*a* and the outer surface 1*b* of the GRP door skin 1 at the same time.

Figure 4:
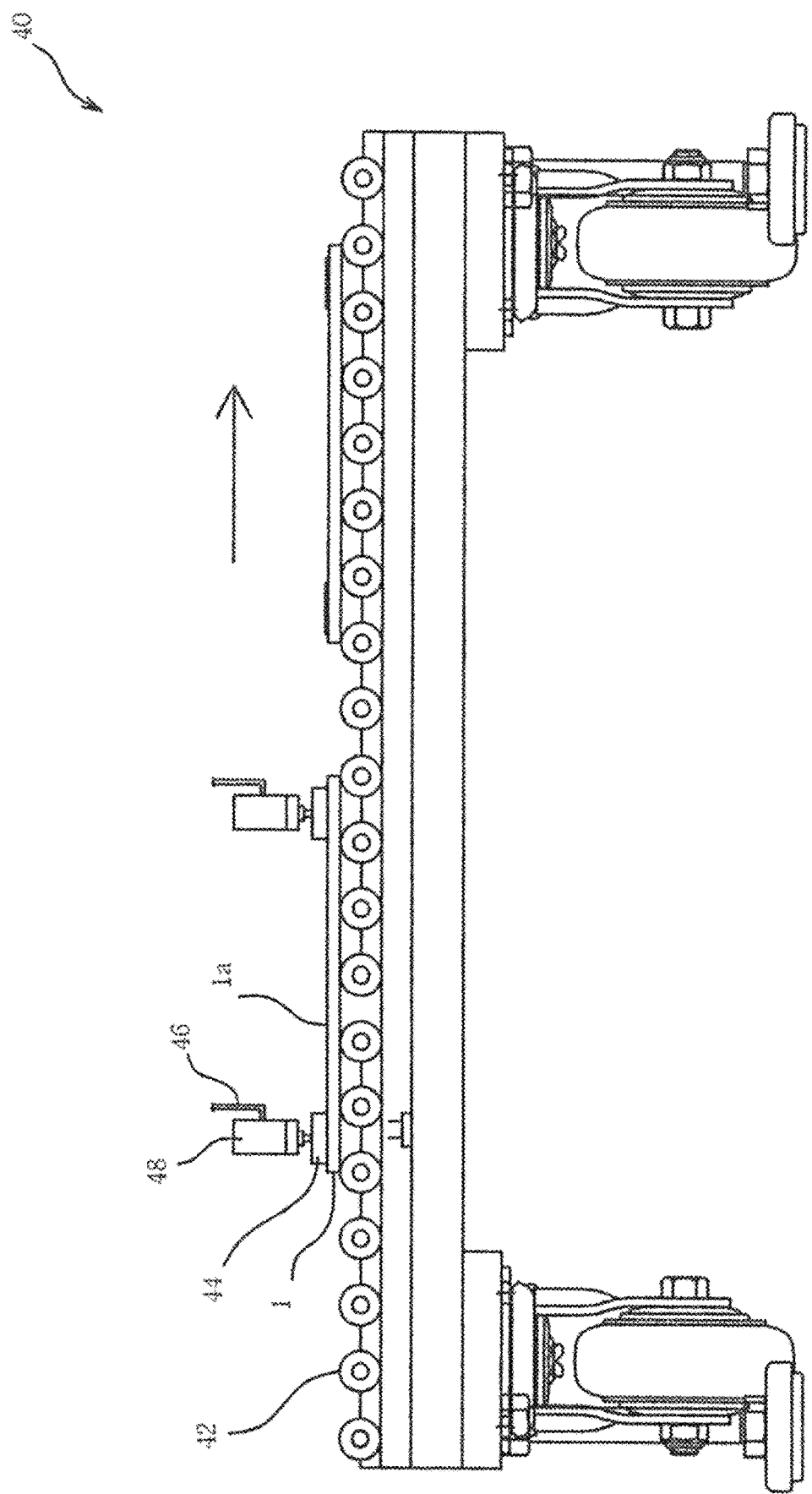
FIG. 4 is a view showing a side surface of a bonding unit of FIG. 2.

Accompanying FIG. 4 is a view showing a side surface of the bonding unit.

As shown in FIG. 4, a bonding unit 40 is a unit automatically applying an adhesive to the inner surface of the GRP door skin 1, i.e., a contact portion of the inner surface 1*a* of the GRP door skin 1, to which a lower surface 2*a* of the wood frame 2 is in contact.

The wood frame 2 is formed in a rectangular frame shape to match with the exterior shape of the GRP door 4, and the wood frame 2 of the rectangular frame shape is in contact with an outer edge surface of the GRP door skin. Therefore, a bonding work of the bonding unit 40 proceeds along the outer portion of the inner surface of the GRP door skin 1.

The bonding unit 40 includes a conveyor 42 moving the GRP door skin 1 that has passed through the plasma treatment process that is a previous process, forwards, an application roller 44 located at an upper portion of the conveyor 42 and being in contact with the GRP door skin 1 moving on the conveyor 42, an adhesive injection hose 46 connected to the application roller 44 and supplying the adhesive for bonding, and an operation stand 48 supporting the application roller 44 and moving the application roller 44 forwards, rearwards, leftwards, and rightwards with power of the drive source so that the adhesive is automatically applied to the outer portion of the inner surface 1*a* of the GRP door skin 1.

Figure 5:
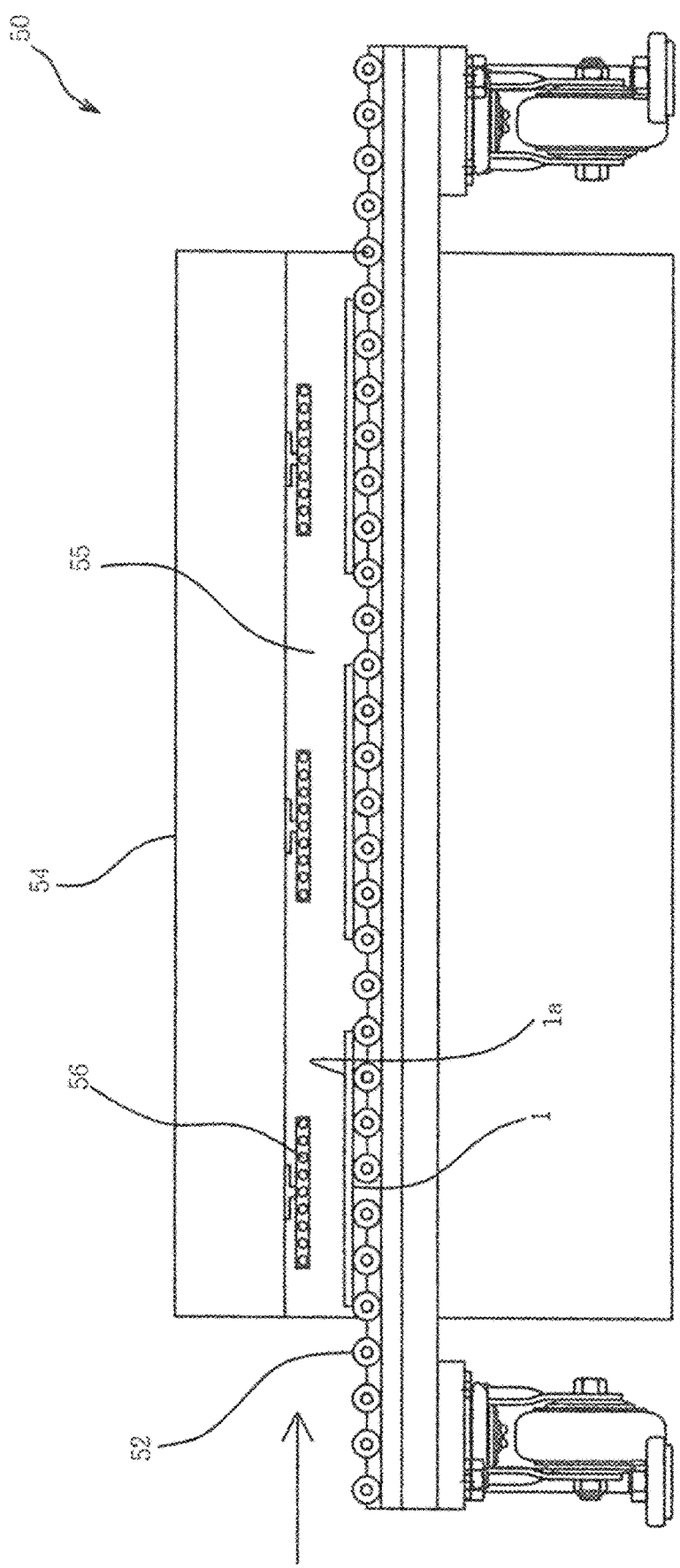
FIG. 5 is a view showing a side surface of a preheating unit of FIG. 2.

Accompanying FIG. 5 is a view showing the preheating unit. As shown in FIG. 5, the preheating unit 50 preheats the adhesive applied to the outer portion of the inner surface of the GRP door skin 1 through the bonding unit 40 to a predetermined temperature to increase the bonding performance of the adhesive.

The preheating unit 50 includes a preheating furnace 54 having a preheating space 55 through which the GRP door skin 1 passes, a heater 56 provided at an upper portion of the preheating space 55 of the preheating furnace 54 and emitting heat with power applied from the outside space, and a conveyor 52 installed while penetrating the preheating space 55 and through which the GRP door skin 1 passes along the preheating space 55 of the preheating furnace 54. In other words, while riding on the conveyor 52 and passing through the preheating space 55, the GRP door skin 1 has an improved bonding performance as the adhesive is preheated by heat source emitted from the heater 56. At this point, it is preferable to allow the GRP door skin 1 to pass through the preheating space 55 with the inner surface 1*a* applied with the adhesive is directed upwards.

Figure 6:
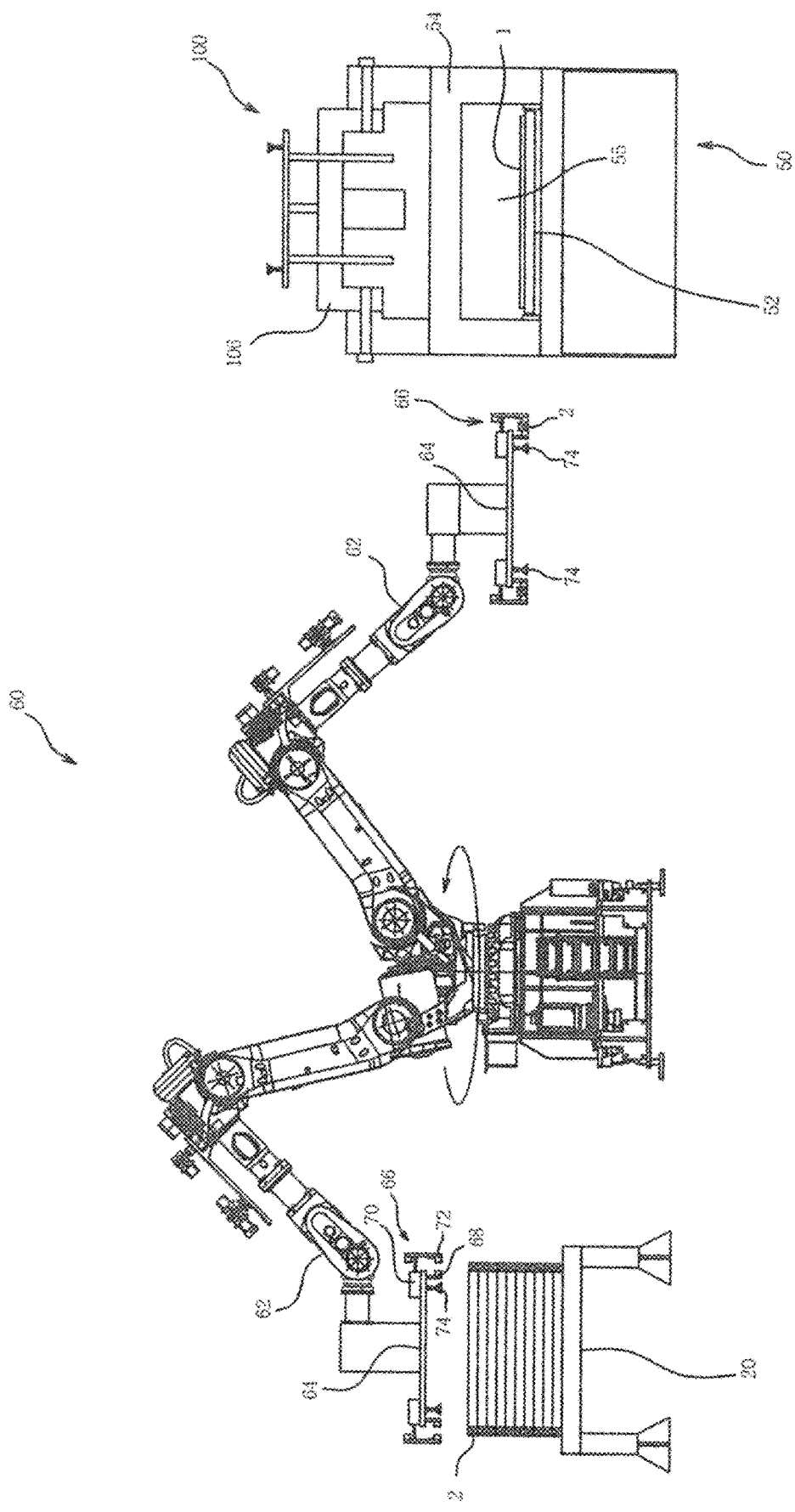
FIG. 6 is a view showing a structure of a GRP door skin and wood frame inserting unit of FIG. 2, the view being taken from the front side.
Figure 7:
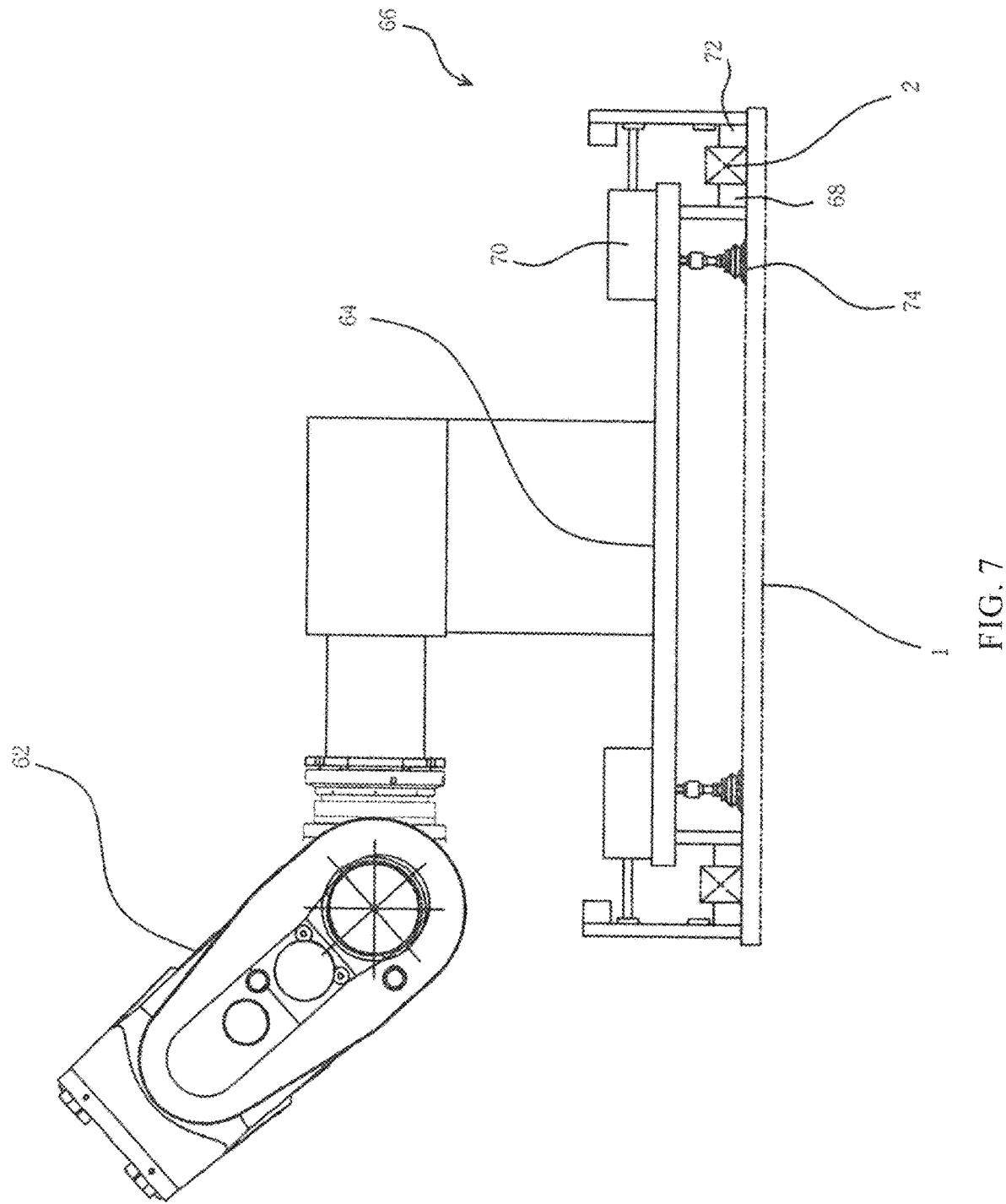
FIG. 7 is an enlarged view showing a main part of FIG. 6.
Figure 8:
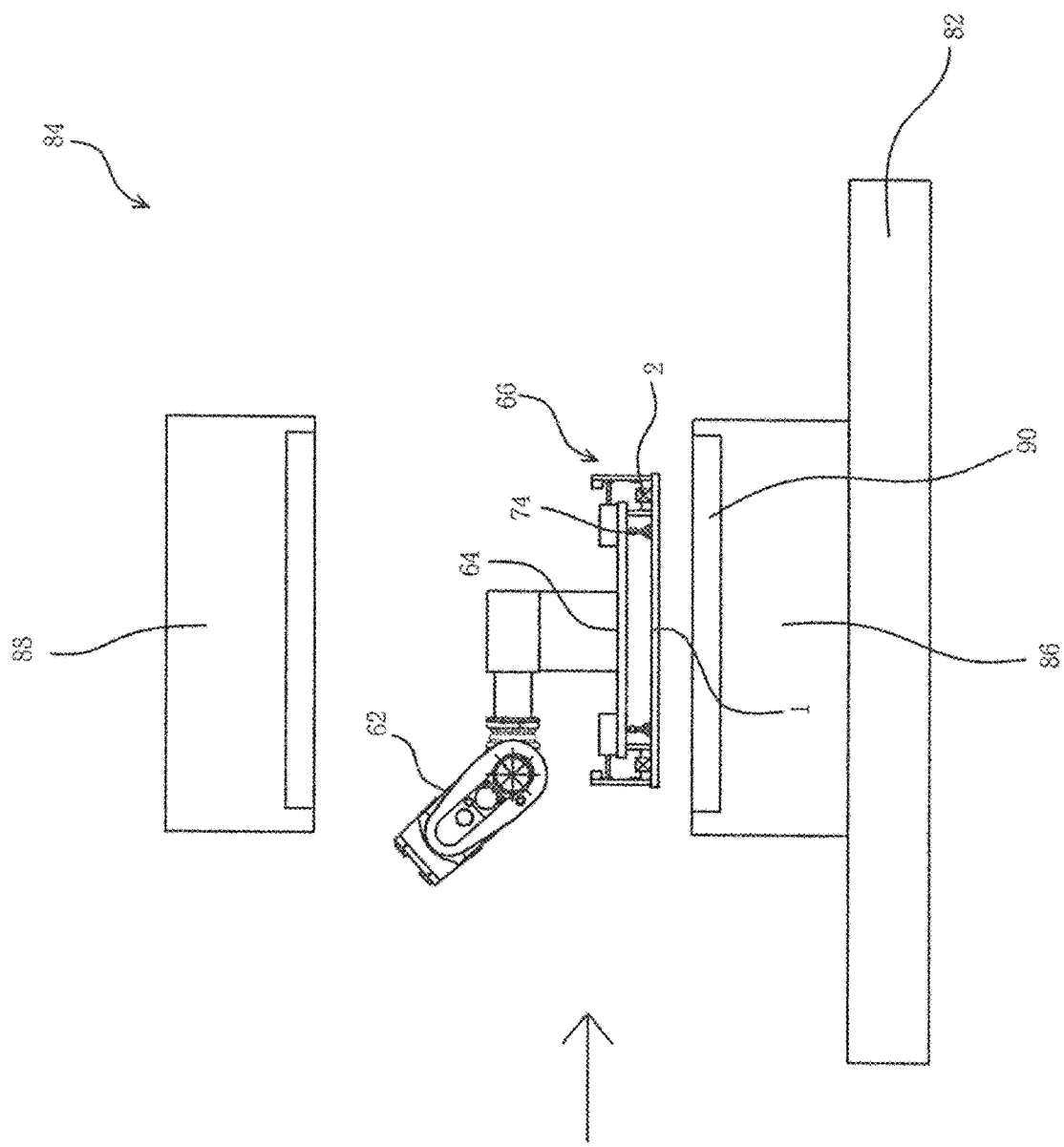
FIG. 8 is a front view showing a structure of a forming mold of FIG. 2.
Figure 9:
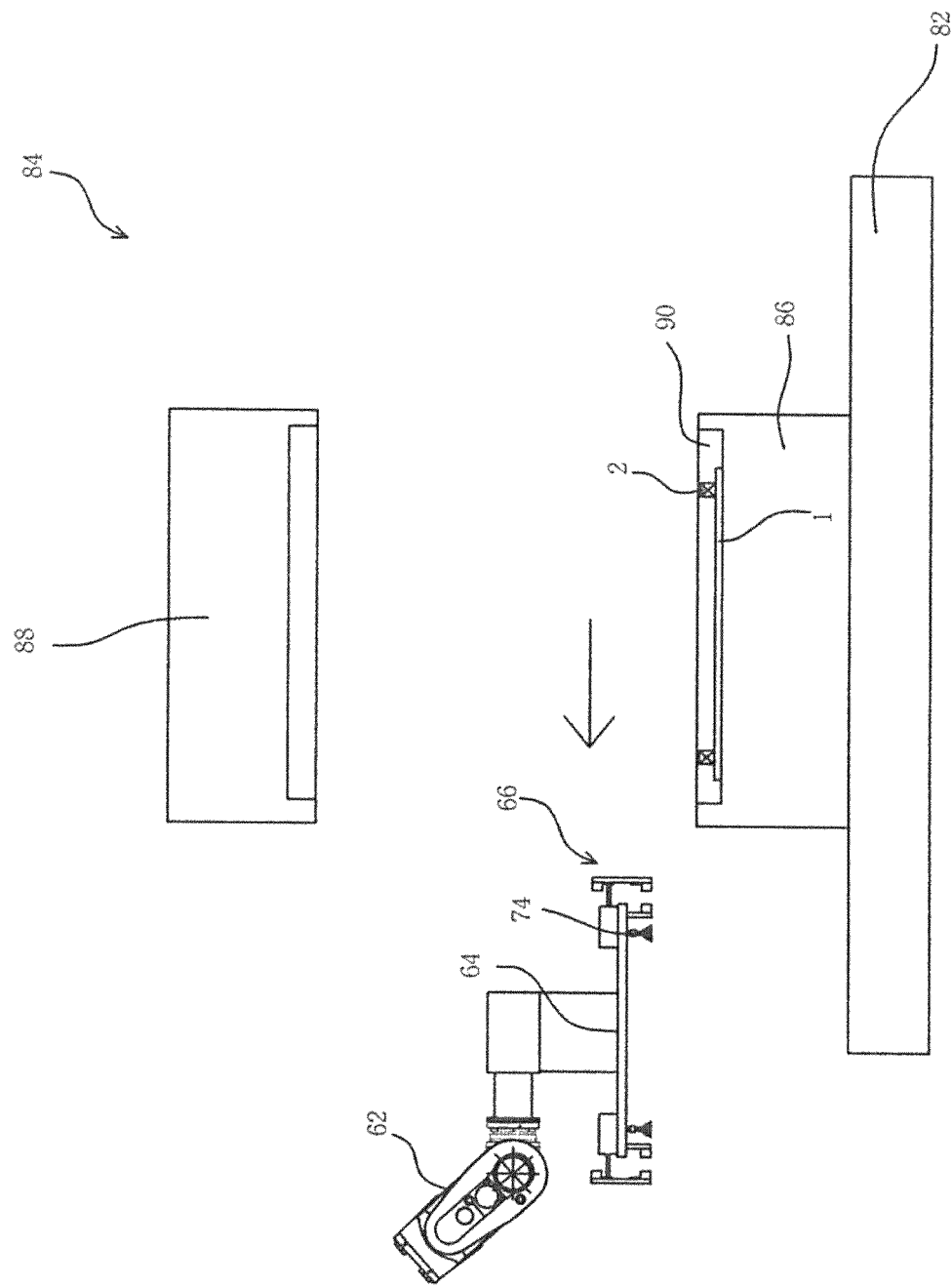
FIGS. 9 to 12 are views successively showing a molding process of the forming mold.
Figure 10:
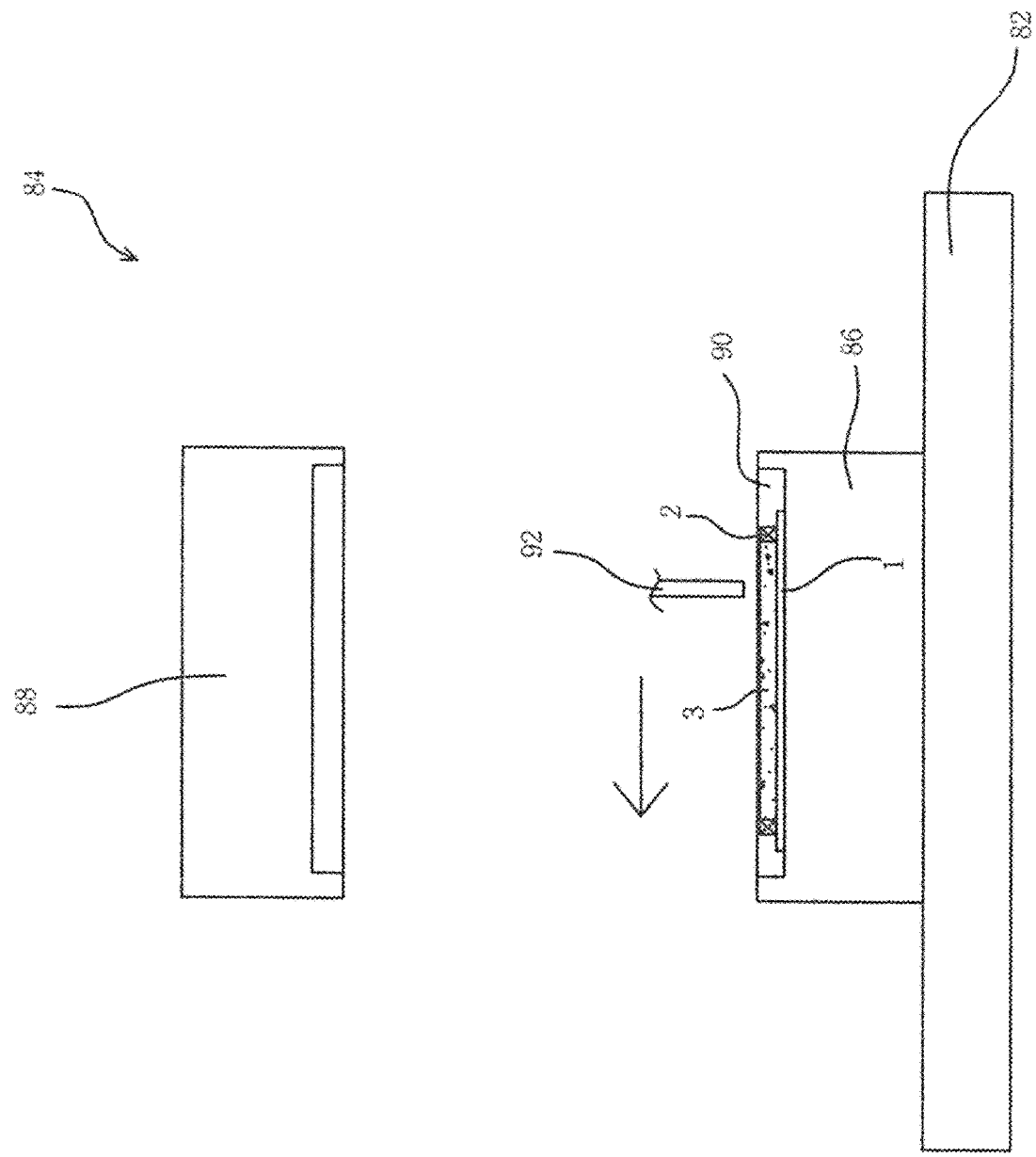
Figure 11:
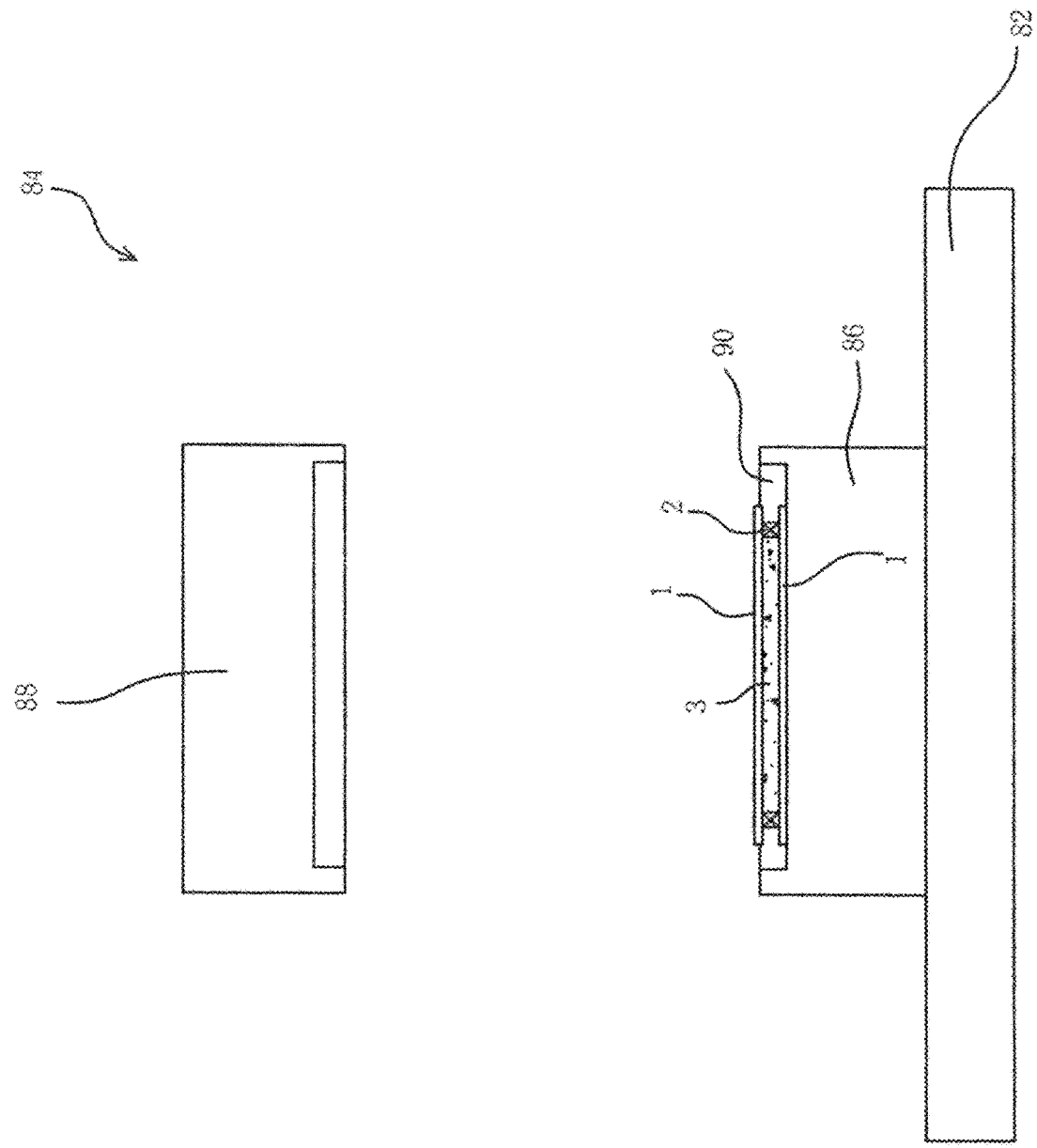
Figure 12:
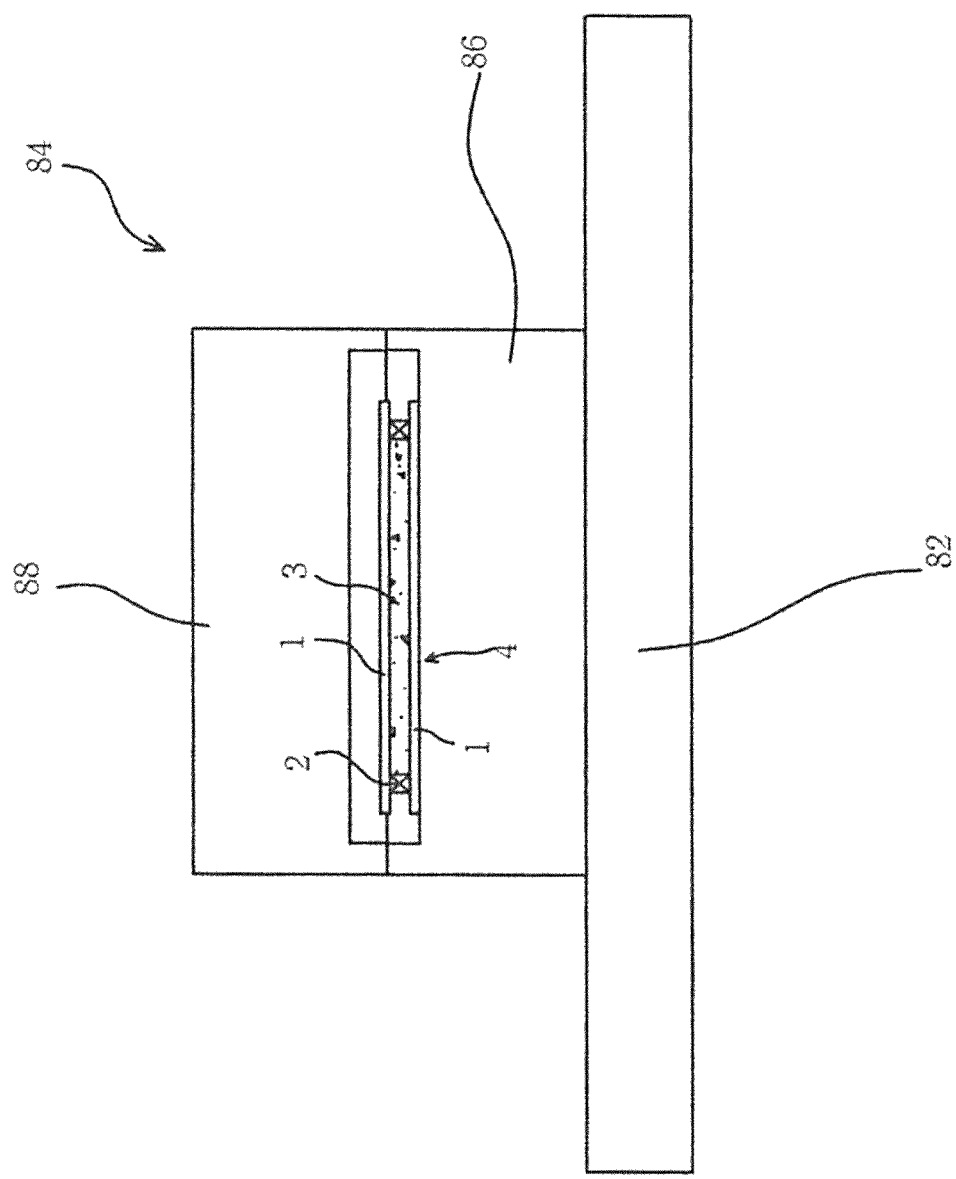

FIG. 6 is a front view showing a structure of the GRP door skin and wood frame inserting unit. FIG. 7 is an extract view showing a main part of FIG. 6.

As shown in FIGS. 6 and 7, the GRP door skin and wood frame inserting unit 60 is a unit that clamps the wood frame 2 stacked in multiple layers on the wood frame stacking stand 20, and places then the clamped wood frame 2 on a bonding surface applied to the inner surface of the GRP door skin 1 that has passed through the preheating furnace 54 while riding on the conveyor 52 of the preheating unit 50 and bonds the lower surface of the wood frame 2 to the inner surface of the GRP door skin 1, and then absorbs the GRP door skin 1 attached with the wood frame 2 and inserts the GRP door skin 1 into a lower mold 86 of a forming mold 84.

As shown in FIGS. 6 and 7, the GRP door skin and wood frame inserting unit 60 includes a robot arm 62, a plate 64 installed at the robot arm 62 and performing movement and reverse operation in response to operation of the robot arm 62, a wood frame clamping part 66 installed at an outer portion of the plate 64 and clamping the wood frame 2 stacked on the wood frame stacking stand 20, and a GRP door skin absorber 74 installed at one surface of the plate 64 and absorbing the GRP door skin 1 attached with the wood frame 2 after the wood frame 2 clamped in the wood frame the wood frame clamping part 66 is attached to the GRP door skin 1.

The wood frame the wood frame clamping part 66 is installed at each of four points along the outer portion of the plate 64, and in describing one of wood frame the wood frame clamping parts 66, the wood frame the wood frame clamping part 66 includes a fixing stand 68 brought into contact with an inner surface of the wood frame 2, and a pressurizing stand 72 located at an outer surface of the wood frame 2 and reciprocating by power of a cylinder 70 and pressurizing the outer surface of the wood frame 2. The wood frame clamping part 66 clamps the wood frame 2 in a method in which after the plate 64 is located above the wood frame 2 with operation of the robot arm 62, the fixing stand 68 is brought into contact with the inner surface of the wood frame 2, and the pressurizing stand 72 compresses the outer surface of the wood frame 2 with driving of the cylinder 70.

The GRP door skin absorber 74 is installed at each of four corners of one surface of the plate 64. The GRP door skin absorber 74 absorbs the GRP door skin 1 after the plate 64 is moved above the GRP door skin 1 that has passed through the preheating unit 50, with operation of the robot arm 62. At this point, before absorbing the GRP door skin 1, the GRP door skin absorber 74 attaches the wood frame 2 clamped in the wood frame the wood frame clamping part 66 to the bonding surface applied to the inner surface of the GRP door skin 1, and then absorbs the GRP door skin 1 to which the wood frame is bonded.

After the GRP door skin 1 to which the wood frame 2 is bonded is inserted with operation of the GRP door skin and wood frame inserting unit 60, the forming unit 80 fills the flame retardant urethane foam 3 into a space 2*a* within the wood frame 2, and while covering the upper surface of the wood frame 2 with a GRP door skin 1 followed, performs thermo-compression bonding to form the GRP door 4 of a complete product. At this point, the GRP door skin 1 covered on the upper surface of the wood frame is supplied after the GRP door skin and wood frame inserting unit 60 absorbs the GRP door skin 1 that has passed through the preheating unit.

The forming unit 80 includes a turntable 82 intermittently rotated, and at least one or more forming molds 84 installed along the circumference of the turntable 82.

FIGS. 8 to 12 are views showing a process of molding a GRP door through the forming mold.

As shown in the drawings, the forming molds 84 have the same structure, and in describing one of the forming molds 84, each forming mold 84 includes upper and lower molds 86 and 88.

The lower mold 86 has a core 90, and in the core 90, the GRP door skin 1 with the wood frame 2 bonded thereto, inserted from the GRP door skin and wood frame inserting unit 60 is received.

The upper mold 88 is located above the lower mold 86 and joined to the lower mold 86 in a press method.

A flame retardant urethane foam inlet 90 is installed at the forming unit 80. After the GRP door skin 1 with the wood frame 2 bonded thereto is received in a core of the lower mold 86, the flame retardant urethane foam inlet 90 fills the flame retardant urethane foam 3 into the space 2a within the wood frame 2.

Before the upper and lower molds 86 and 88 of the forming unit 80 join to each other, the GRP door skin and wood frame inserting unit 60 is supplied with the GRP door skin 1 supported while being overturned from the GRP door skin reverse unit 100 and allow the upper and lower molds 86 and 88 to join to each other while an open front surface of the wood frame 2 is covered with the GRP door skin 1, thereby proceeding thermo-compression bonding. At this point, when the GRP door skin 1 is reversed, the inner surface of the GRP door skin 1 applied with the adhesive is directed downwards, and as such, the upper surface of the wood frame 2 may be bonded to the bonding surface applied with the inner surface of the GRP door skin 1.

Each of the upper and lower molds 86 and 88 includes a heater, and the heater activates the adhesive bonding the wood frame 2 and the GRP door skin 1 in the compression process to improve the bonding performance.

While thermo-compression is performed in the forming mold 84, the turntable 82 is intermittently rotated and moves a next forming mold 84 to a location into which the wood frame 2 and the GRP door skin 1 are inserted.

Figure 13:
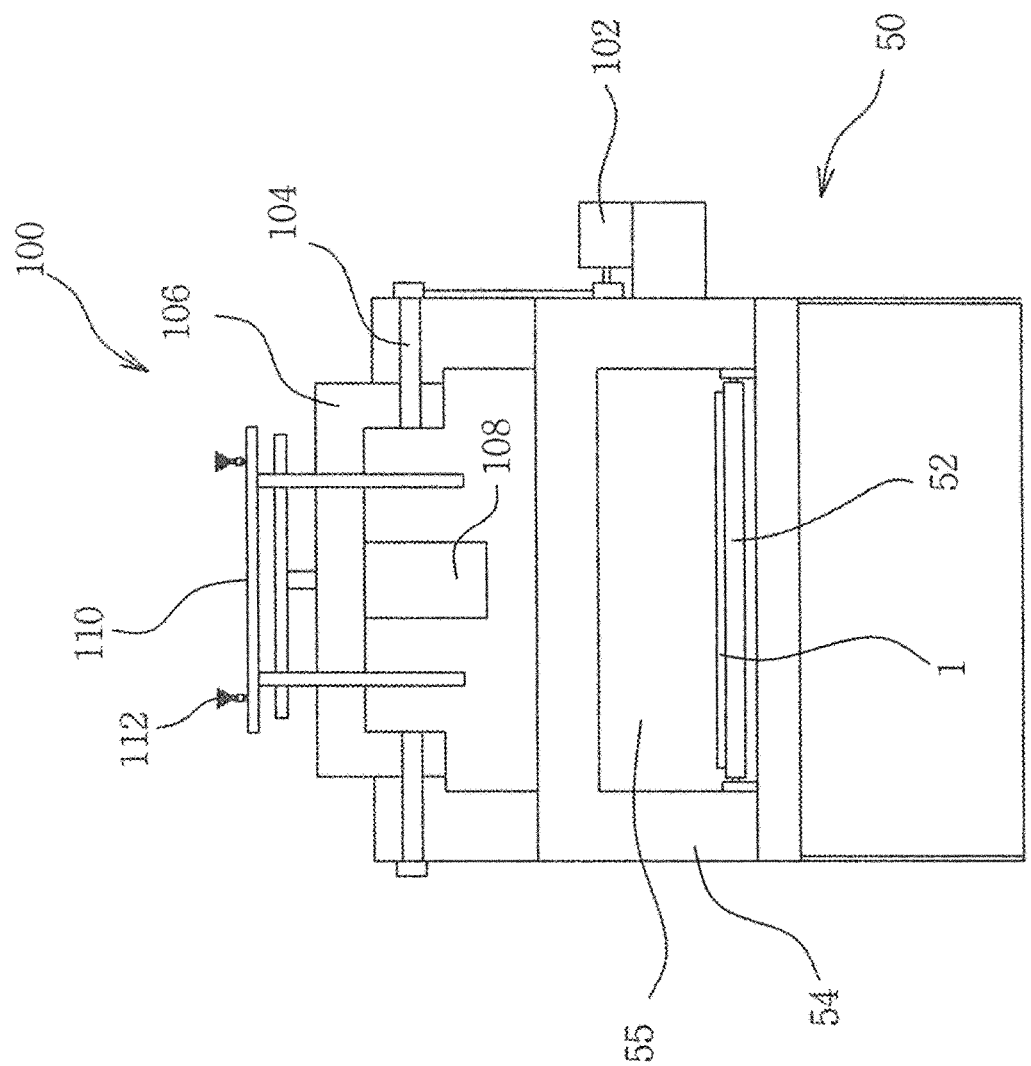
FIG. 13 is a front extract view showing a GRP door skin reverse unit of FIG. 2.
Figure 14:
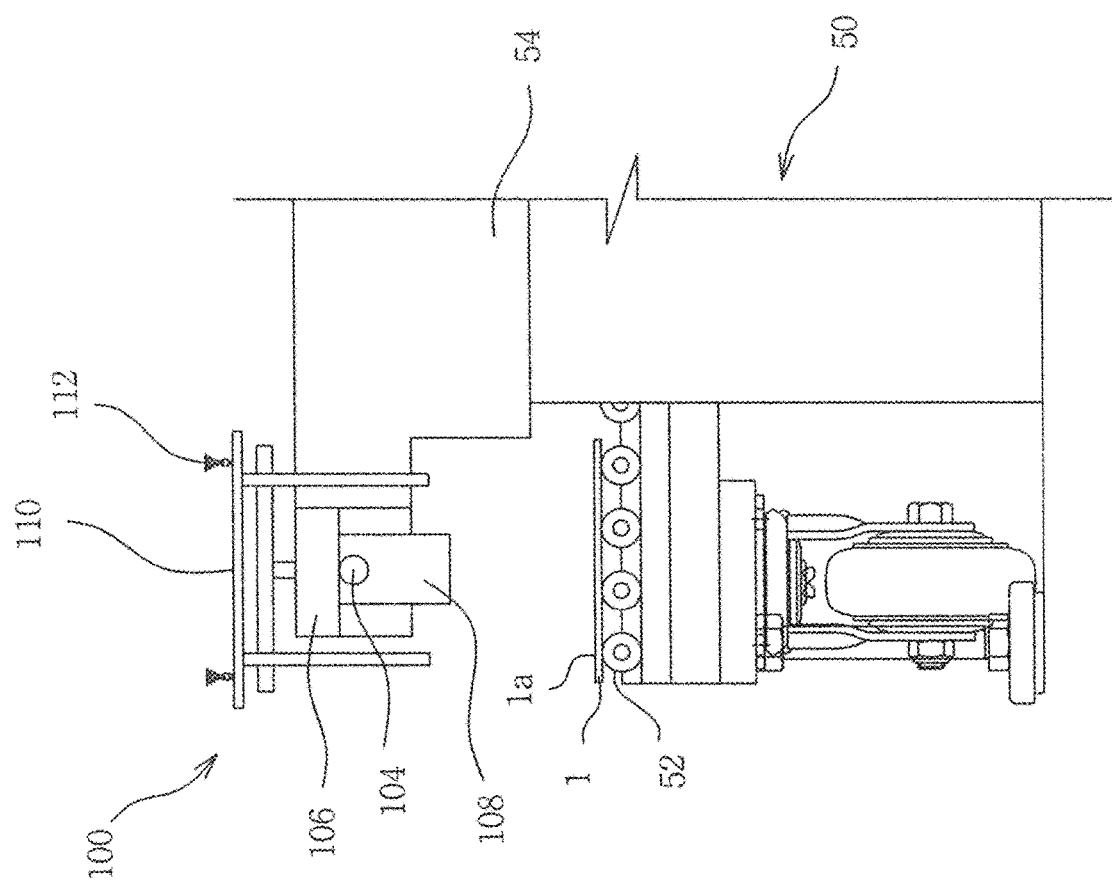
FIGS. 14 to 17 are views successively showing an operational process of the GRP door skin reverse unit on the basis of a side surface thereof.
Figure 15:
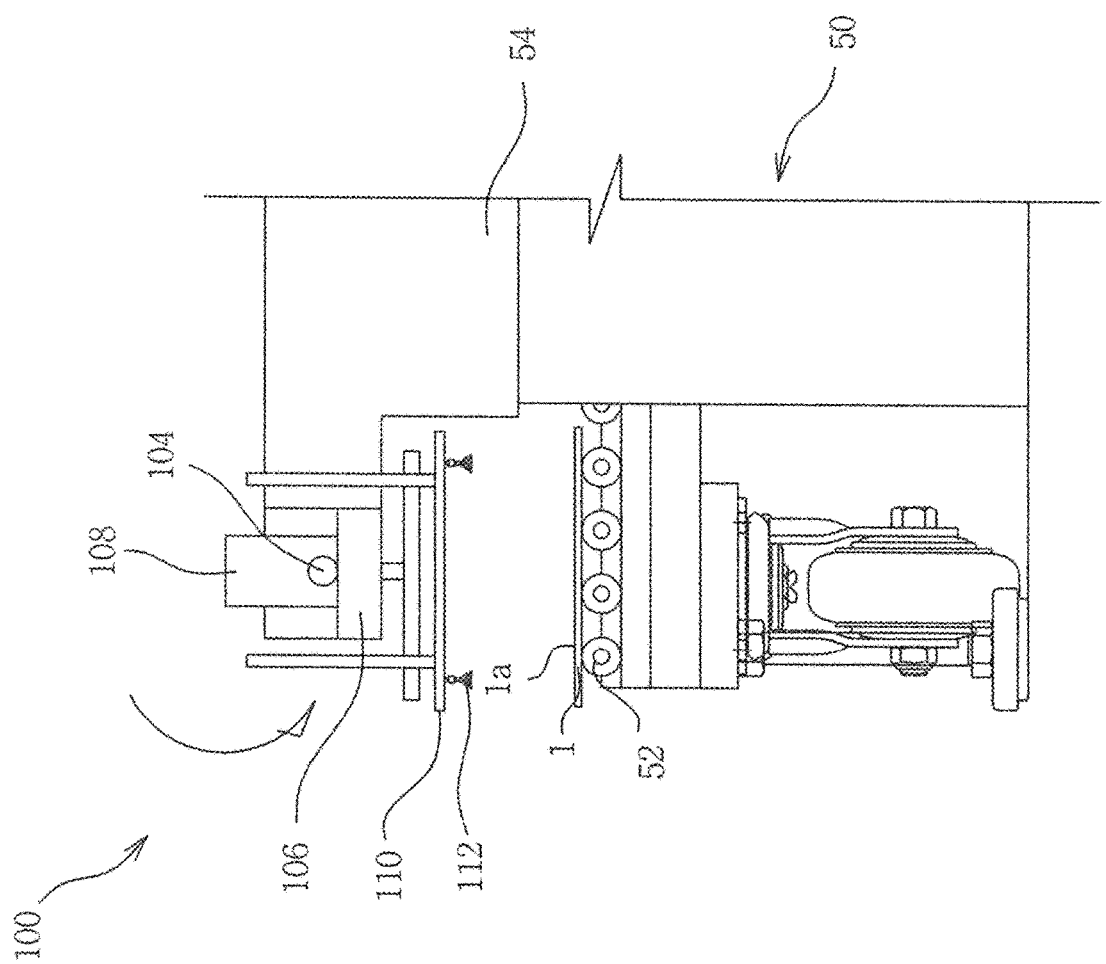
Figure 16:
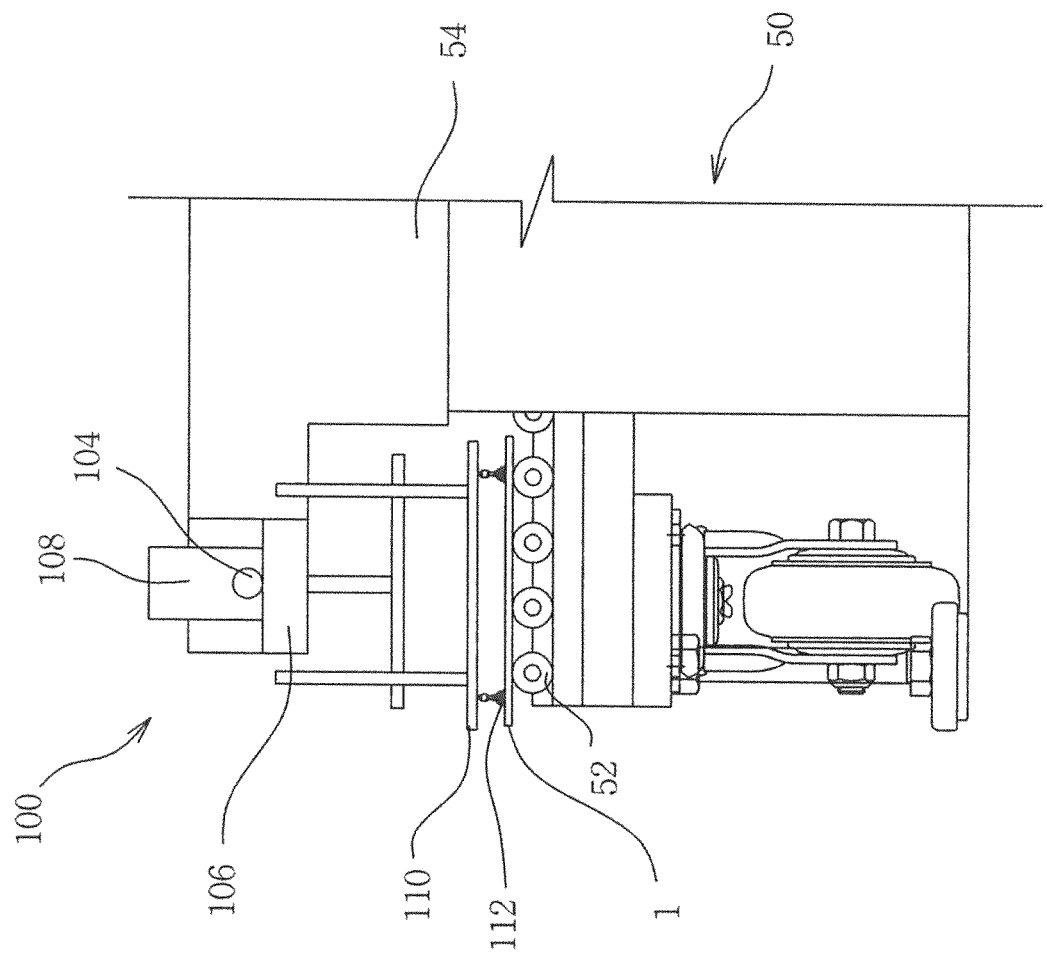
Figure 17:
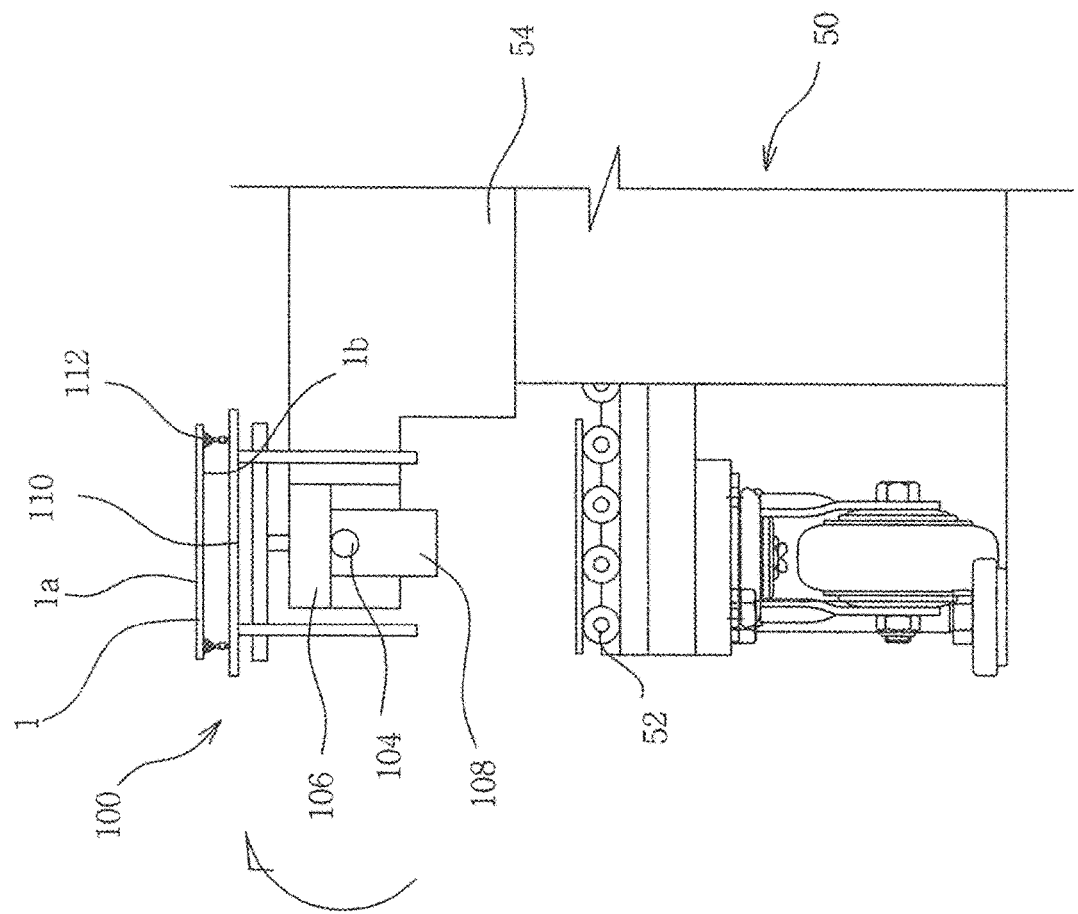

Accompanying FIG. 13 is an extract view showing a structure of the GRP door skin reverse unit.

As shown in FIG. 13, the GRP door skin reverse unit 100 is a unit while absorbing the GRP door skin 1 that has passed through the preheating furnace 54 while riding on the conveyor 52 of the preheating unit 50 and supporting the GRP door skin 1 in an overturned state. In other words, the GRP door skin 1 supported while being overturned in the GRP door skin reverse unit 100 is disposed with the inner surface 1a applied with the adhesive faces downwards, and this is because of allowing, when the overturned GRP door skin 1 is placed on the upper surface of the wood frame 2 with driving of the GRP door skin and wood frame inserting unit 60, the contact surface of the GRP door skin 1 to be brought into automatically contact with the upper surface of the wood frame 2.

The GRP door skin reverse unit 100 includes a shaft 104 rotated by power of the motor, a tilting frame 106 shaft-coupled to the shaft 104 and rotated on the shaft 104, a cylinder 108 supported by the tilting frame 106, a plate 110 coupled to a rod of the cylinder 108 and moved forwards and rearwards by power of the cylinder 108, and an absorber 112 installed at a corner of one surface of the plate 110 and absorbing the GRP door skin 1.

As shown in FIGS. 14 to 17, The GRP door skin reverse unit 100 is operated such that after the plate 110 is lowered with driving of the cylinder 108 to allow the absorber 112 to absorb the GRP door skin 1, the tilting frame 106 is tilted by power of the motor and raise the absorbed GRP door skin 1 in the overturned state, upwards, and in this state, the absorber 74 of the GRP door skin and wood frame inserting unit 60 absorbs the GRP door skin 1 supported by the GRP door skin reverse unit 100 in the overturned state, and then places the GRP door skin on the upper surface of the wood frame 2 received in the core 90 of the lower mold 86, and as such, the upper surface of the wood frame 2 is bonded on the bonding surface applied to the inner surface of the GRP door skin 1.

As described above, the wood frame 2 with the GRP door skin 1 bonded to the lower surface thereof is placed on the forming mold 84, the flame retardant urethane foam 3 is filled into the space 2a of the wood frame 2, and then thermo-compression bonding is performed while the upper surface of the wood frame 2 is covered with the GRP door skin 1, thereby completing formation of the GRP door 4 of a complete product.

Hereinbelow, a process of manufacturing the GRP door by using the above-mentioned units will be described with reference to FIGS. 1 to 17.

First, the GRP door skin 1 and the wood frame 2 that are manufactured through the previous process are held on the GRP door skin stacking stand 10 and the wood frame stacking stand 20, respectively.

Next, the robot arm is driven to absorb each GRP door skin 1 stacked on the GRP door skin stacking stand 10, and then place the absorbed GRP door skin on the conveyor 32 of the plasma processing unit 30.

While the conveyor 32 of the plasma processing unit 30 is driven to transfer the GRP door skin 1 forwards, the plasma processors 34 and 36 located below and above the conveyor 32 simultaneously perform the plasma-process for the inner surface 1a and the outer surface 1b of the GRP door skin 1 moved while reciprocating leftwards and rightwards.

Next, the GRP door skin 1 plasma-processed is supplied to the conveyor 42 of the bonding unit 40 and the conveyor 42 of the bonding unit 40 is driven to transfer the GRP door skin 1 forwards.

When the GRP door skin 1 is located in a regular position below the application roller 44 of the bonding unit 40 as the conveyor 42 of the bonding unit 40 is driven, the application roller 44 is brought into contact with the inner surface of the GRP door skin 1 by operation of the operation stand 48, and the adhesive is injected into the application roller 44 through the adhesive injection hose 46 and simultaneously the application roller 44 is moved forwards, rearwards, leftwards, and rightwards to automatically apply the adhesive to the inner surface of the GRP door skin 1. At this point, as the wood frame 2 is bonded to the adhesive applied to the inner surface of the GRP door skin 1, the adhesive is automatically applied to the inner surface of the GRP door skin 1 to match to a shape of the wood frame 2.

Next, the GRP door skin 1 on which the bonding process proceeds passes through the preheating furnace 54 while riding on the conveyor 52 of the preheating unit 50. In this process, the bonding surface of the adhesive applied to the inner surface of the GRP door skin 1 is heated to a predetermined temperature so that the adhesive has the optimum bonding performance.

Next, while the robot arm 62 of the GRP door skin and wood frame inserting unit 60 is driven, the robot arm 62 clamps the wood frame 2 stacked on the wood frame stacking stand 20, and the GRP door skin 1 that has passed through the preheating furnace 54 through the preheating process is absorbed, and then is placed on the core 90 of the lower mold 86 that is the forming unit 80.

In other words, while the robot arm 62 of the GRP door skin and wood frame inserting unit 60 is driven, the robot arm 62 clamps the wood frame 2 stacked on the wood frame stacking stand 20 first by using the wood frame the wood frame clamping part 66 installed at the plate 64.

Next, as the plate 64 to which the wood frame 2 is clamped is moved again, the GRP door skin 1 that has passed through the preheating furnace 54 is absorbed by using the GRP door skin absorber 74 installed at the plate 64. At this point, in the process of absorbing the GRP door skin 1, the wood frame 2 clamped in the wood frame the wood frame clamping part 66 is bonded to the bonding surface applied to the inner surface 1a of the GRP door skin 1.

Next, the GRP door skin 1 and the wood frame 2 absorbed and clamped in the GRP door skin absorber 74 and the wood frame clamping part 66, respectively, are placed in the core 90 of the lower mold 86 that is the forming unit with driving of the robot arm 62.

Next, the flame retardant urethane foam 3 is filled into the space 2a within the wood frame 2.

Next, the GRP door skin reverse unit 100 is driven to absorb one layer of the GRP door skin 1 that has passed through the preheating furnace 54, and then to raise the absorbed GRP door skin 1 in an overturned state, upwards. As such, the GRP door skin 1 is supported by the GRP door skin reverse unit 100 while the bonding surface applied to the inner surface thereof is directed downwards.

Next, the robot arm 62 of the GRP door skin and wood frame inserting unit 60 is driven to absorb the GRP door skin 1 supported by the GRP door skin reverse unit 100 in an overturned state, by using the GRP door skin absorber 74, and then to place the GRP door skin 1 on the wood frame 2 received in the core 90 of the lower mold 86. At this point, the placing the GRP door skin 1 in the overturned state on the wood frame 2 is to direct the inner surface of the GRP door skin 1 downwards, so that when the GRP door skin 1 is placed on the wood frame 2, the upper surface of the wood frame 2 can be bonded on the bonding surface applied to the inner surface of the GRP door skin 1.

After the GRP door skin 1, the wood frame 2, and the GRP door skin 1 are successively received in the core 90 of the lower mold 86 through the above-described process, the upper mold 88 is joined thereto to thermo-compress the GRP door skin 1, the wood frame 2, and the GRP door skin 1, and then a next forming mold 84 is located into a regular position thereof with driving of the turntable 82.

Next, after thermo-compression is completed for a predetermined time, the upper and lower molds are removed and then the GRP door 4 of a complete product is formed.

The invention claimed is:

1. A glass fiber reinforced plastic (GRP) door manufacturing system configured to manufacture a GRP door composed of a wood frame, a first GRP door skin and a second GRP door skin covered on each of an upper surface and a lower surface of the wood frame, and a flame retardant urethane foam filled in a space within the wood frame, wherein the GRP door manufacturing system comprises:

a GRP door skin stacking stand, wherein GRP door skins including the first GRP door skin and the second GRP door skin are stacked on the GRP door skin stacking stand in multiple layers;

a wood frame stacking stand, wherein the wood frame is stacked on the wood frame stacking stand in multiple layers;

a first conveyor configured to transfer the GRP door skins supplied from the GRP door skin stacking stand along a conveyance path;

a plasma processing unit comprising plasma processors, the plasma processors being respectively located at an upper surface and a lower surface of the first conveyor, being configured to be moved perpendicular to the conveyance path by power of a driving source, and configured to respectively plasma-process an inner surface and an outer surface of the GRP door skins moving along the conveyance path on the first conveyor;

a second conveyor located downstream from the plasma processing unit and configured to transfer the GRP door skin after plasma processing;

a bonding unit located above the second conveyor and comprising an application roller configured to apply an adhesive on the inner surface of the GRP door skins moving on the second conveyor;

a third conveyor configured to transfer the GRP door skins after adhesive is applied;

a preheating unit surrounding the third conveyor and configured to preheat the GRP door skins moving on the third conveyor;

a GRP door skin and wood frame inserting unit comprising: a robot arm, a plate, a wood frame clamping part, and a GRP door skin absorber;

wherein the robot arm is located downstream from the preheating unit and configured to be operated according to a control signal preset in a control unit;

the plate is provided on the robot arm;

the wood frame clamping part is provided on an outer portion of the plate and configured to clamp and take out the wood frame stacked on the wood frame stacking stand; and the GRP door skin absorber is provided on an outer surface of the plate, wherein while the wood frame clamping part clamps the wood frame, the GRP door skin absorber absorbs and takes out the first GRP door skin after the first GRP door skin has passed through the preheating unit;

a GRP door skin reverse unit located at above the third conveyor downstream from the preheating unit, wherein the GRP door skin reverse unit is configured to absorb and reverse the second GRP door skin to a reverse position after the second GRP door skin has passed through the preheating unit, wherein in the reverse position the inner surface of the second GRP door skin is directed downwards after previously facing upwards;

a forming unit comprising a forming mold including a lower mold and an upper mold;

the lower mold comprising a core, wherein the wood frame and the first GRP door skin are supplied onto the core by the GRP door skin and wood frame inserting unit;

a flame retardant urethane foam inlet configured to fill the flame retardant urethane foam into the space within the wood frame after the wood frame is received with the first GRP door skin onto the core of the lower mold;

wherein the GRP door skin and wood inserting unit is configured to retrieve the second GRP door skin supported in the reverse position on the GRP door skin reverse unit and to supply the second GRP door skin onto the wood frame and first GRP door skin received onto the core of the lower mold; and wherein the forming mold is configured to form the GRP door by thermocompressing the second GRP door skin, the wood frame, and the first GRP door skin between the lower mold and the upper mold.

2. The GRP door manufacturing system according to claim 1, wherein the GRP door skin reverse unit comprises:

a shaft rotated by power of a motor;

a tilting frame shaft-coupled to the shaft and rotated on the shaft;

a cylinder supported by the tilting frame;

a reverse unit plate where a rod of the cylinder is coupled and moved forwards and rearwards by power of the cylinder; and an absorber provided on a corner of one surface of the reverse unit plate and configured to absorb the second GRP door skin.

\* \* \* \* \*